(No Model.)

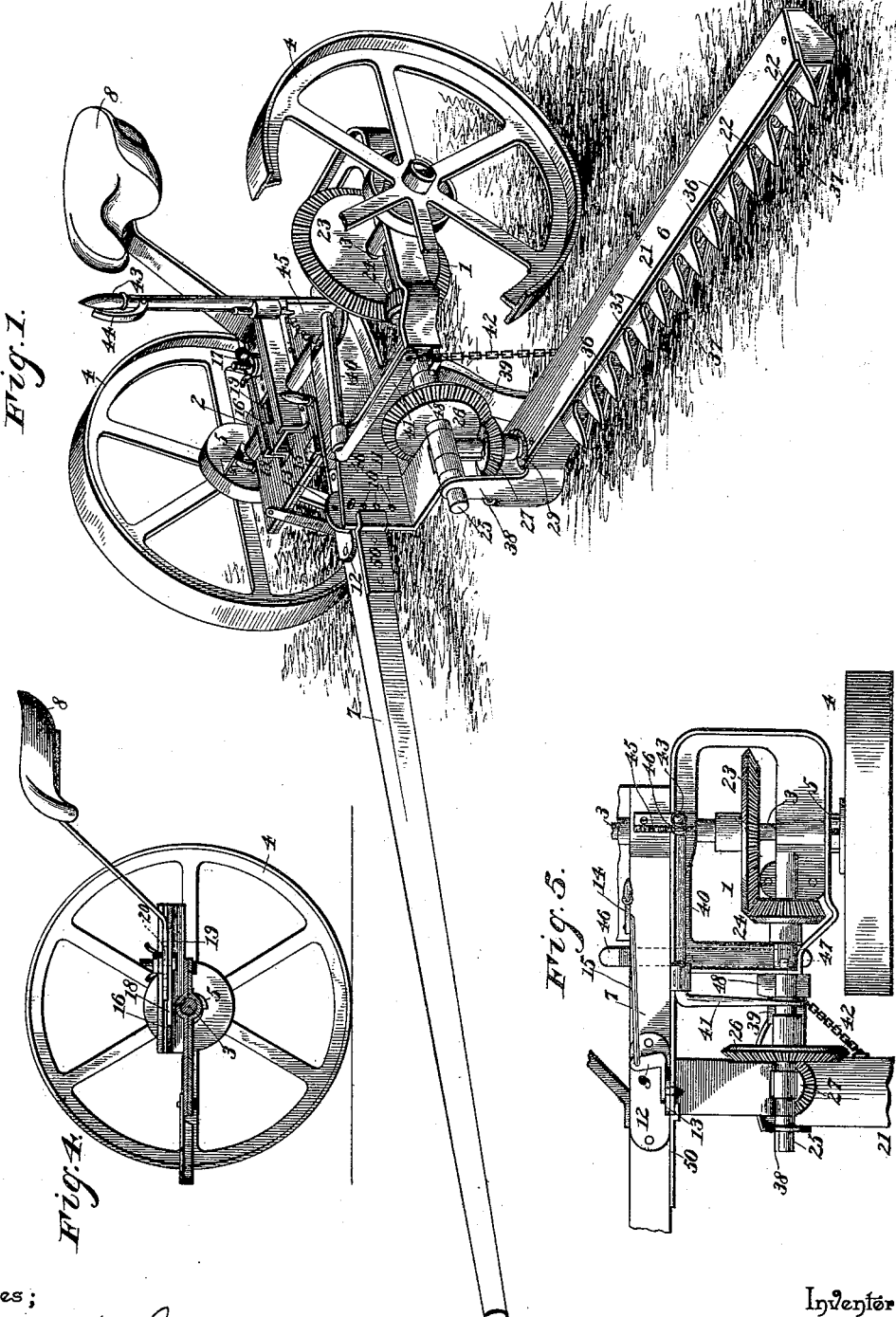

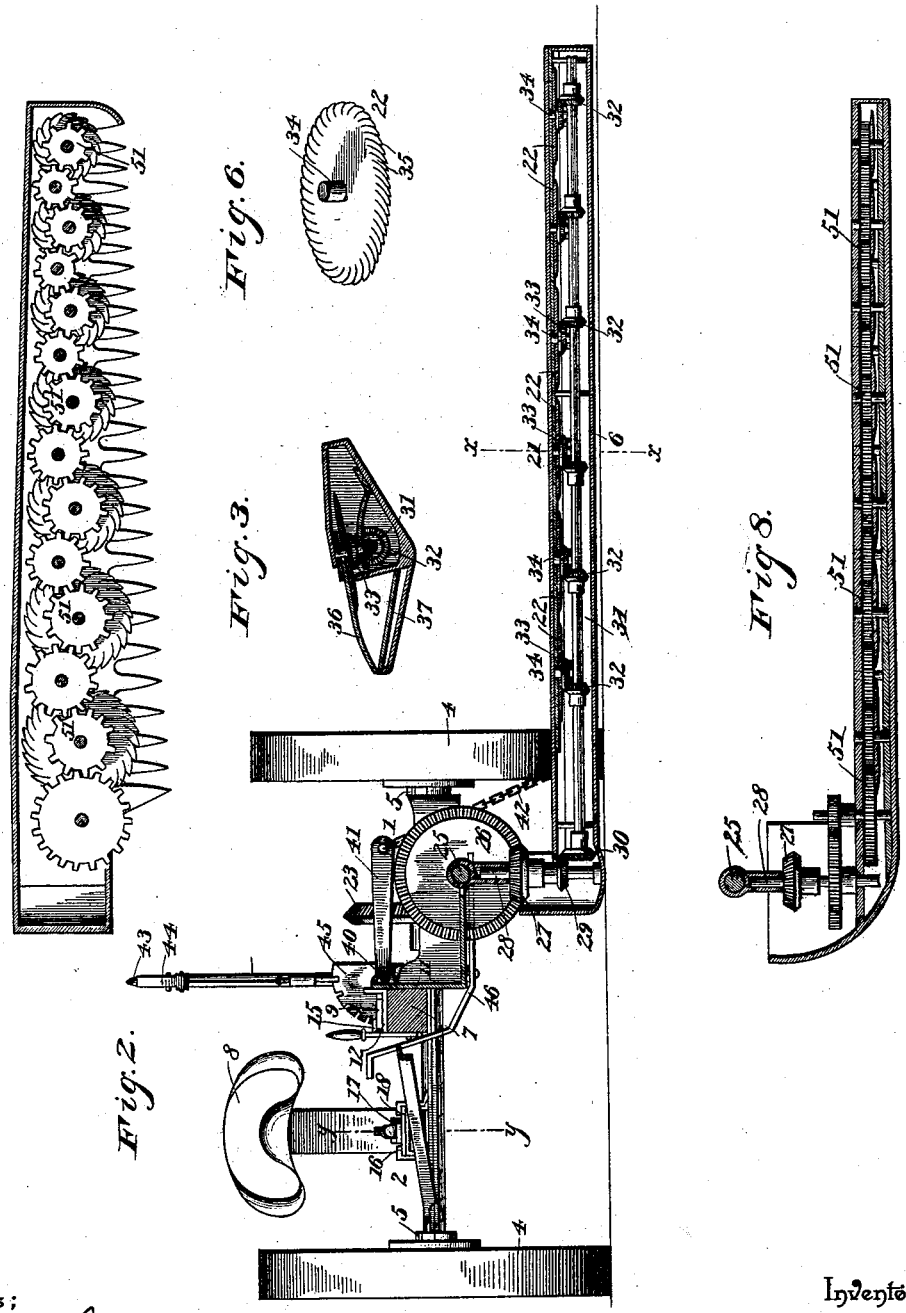

3 Sheets—Sheet 3.

J. BEERMAKER.
MOWING MACHINE.

No. 507,962.

Patented Oct. 31, 1893.

Fig. 9.

Witnesses;

Inventor,
John Beermaker,
By his Attorneys,

UNITED STATES PATENT OFFICE.

JOHN BEERMAKER, OF WAHOO, NEBRASKA.

MOWING-MACHINE.

SPECIFICATION forming part of Letters Patent No. 507,962, dated October 31, 1893.

Application filed June 8, 1892. Serial No. 436,009. (No model.)

*To all whom it may concern:*

Be it known that I, JOHN BEERMAKER, a citizen of the United States, residing at Wahoo, in the county of Saunders and State of Nebraska, have invented a new and useful Mowing-Machine, of which the following is a specification.

The invention relates to improvements in mowing machines to cut grain, lawn-grass or hedge.

The object of the present invention is to simplify and improve the construction of mowing machines and to increase their effectiveness.

The invention consists in the construction and novel combination and arrangement of parts hereinafter fully described, illustrated in the accompanying drawings and pointed out in the claim hereto appended.

In the drawings—Figure 1 is a perspective view of a mowing machine constructed in accordance with this invention. Fig. 2 is a transverse sectional view. Fig. 3 is a detail sectional view of the cutting mechanism, the section being taken on line $x$—$x$ of Fig. 2. Fig. 4 is a vertical sectional view on line $y$—$y$ of Fig. 2. Fig. 5 is a plan view of a portion of the main frame. Fig. 6 is a detail view of one of the cutting disks. Fig. 7 is a horizontal sectional view showing one form of cutting mechanism. Fig. 8 is a vertical sectional view of the cutting mechanism shown in Fig. 7. Fig. 9 is a front elevation partly in section, the cutting apparatus being shown elevated.

Like numerals of reference indicate corresponding parts in all the figures of the drawings.

1 and 2 designate sections of a frame, which is mounted on an axle 3 and is supported by drive wheels 4. The drive wheels are connected with the axle by clutch mechanisms 5 and cause a rotation of the axle when the machine is moving forward to actuate the cutting mechanism 6, and the said wheels loosely revolve on the spindles of the axles when the machine is being backed and do not cause the axle to rotate.

The section 1 of the frame carries the gearing which communicates motion from the axle to the cutting mechanism; and the other section 2 has a draft pole 7 attached to it and carries an adjustable seat 8, and is adapted to be tilted on the axle to bring the pole to a proper position to suit the draft animals.

In order to prevent the lifting of the pole raising or interfering with the cutting mechanism, the section 2 is adjustably connected to the section 1 by means of a bell-crank lever 9 fulcrumed on the pole and provided with a tooth arranged to engage any one of a series of perforations 10 of a vertical flange 11 of the section 1. The bell-crank lever is arranged on a bearing plate 12 which is provided with a keeper flange 13, and the bell-crank lever is controlled by a hand lever 14 which is connected with the same by a rod 15. The adjustable seat 8 has its standard arranged in longitudinal ways 16 of the section 2, and is adapted to be moved backward and forward over the axle to produce the proper balance and it is secured in its adjustment by a set screw 17. The ways 16 are formed by a bracket plate which is rectangular in cross-section, and which has its longitudinal edges bent horizontally and secured to the main frame, and angle plates secured at the sides of the bracket plate and conforming to the configuration of the same and having their inner longitudinal edges slightly separated from the bracket plate to provide the ways. The bracket plate 18 is provided at its middle with a longitudinal slot 19, in which is arranged the set screw 17, which passes through a perforation 20 of the lower end of the standard of the seat, and a series of such perforations is provided to increase the adjustment of the seat.

The cutting mechanism which consists of a finger bar 21 and a series of rotary cutter disks 22 mounted in the finger bar, receives its motion from the axle upon which is mounted a gear wheel 23 meshing with a beveled pinion 24 on the inner end of a horizontally disposed shaft 25 journaled in suitable bearings and disposed longitudinally of the machine and carrying a cog wheel 26 which meshes with a bevel gear 27 of a vertical counter shaft 28; and the latter is provided at its lower end with a bevel gear 29 which meshes with a similar gear 30 of a cutter operating shaft 31. The cutter operating shaft 31 is journaled in suitable bearings of the finger bar casing, and has arranged on it at intervals bevel pinions 32 which mesh with similar gears 33 disposed on vertical stub shafts 34 and communicating motion to the rotary cutter disks 22 which are secured to them. The rotary cutter disks have peripheral file-teeth 35, and are disposed between upper and lower fingers 36 and 37 of the finger-bar casing. When the machine moves forward the carrying wheels are by the clutch mechanism made rigid with and cause a rotation of the axle and produce an operation of the cutting mechanism; but when the machine is backed, the carrying wheels revolve freely without rotating the axle.

The finger-bar has its inner end hinged by arms 38 and 39 to the horizontal shaft 25; and it is adapted to be raised to a vertical position or to be swung over across the tongue by a rock-shaft 40 having an arm 41 at its front end connected by a chain 42 with the finger bar casing, and provided at its rear end with a handle arm 43, upon which is mounted a latch mechanism 44, arranged to engage a ratchet 45 whereby the rock shaft is secured at any desired adjustment of the cutting mechanism. The cutting mechanism is held rigidly in a vertical position and is prevented falling across the tongue by an L-shaped lever 46 fulcrumed on the main frame, and provided at the end of its horizontal arm with a recess 47 adapted to receive a lug 48 on the arm 39 of the finger bar casing. When the finger bar casing is in a horizontal position the lug 48 extends horizontally from the inner side of the upper end of the arm 39, and when the finger bar is raised to a vertical position the lug is carried beneath the shaft in position to be engaged by the L-shaped lever 46. The other arm of the L-shaped lever is extended vertically on one side of the draft pole within reach of the operator.

It will be seen that the two sections of the main frame are vertically adjustable on each other to bring the cutting mechanism in proper position, and to adjust the parts to the draft animals; and the two sections are guided in their vertical adjustment by a keeper-plate 50 secured to the draft pole and provided at its rear end with a bend receiving the front end of the vertical perforated flange.

The beveled gear adapts the cutting mechanism for cutting a high stubble; and the flat horizontally disposed gear wheel 51 enables the machine to make a very close cut, as illustrated in Figs. 7 and 8. The gear wheels 51 are all arranged in the same horizontal plane, and the cutter disks are disposed beneath the gear wheels 51, whereby the cutter disks are brought much closer to the ground than is the case when beveled gear and counter shafts are employed.

The mower is adapted for cutting all kinds of grain, grass, lawn grass and the like, and the cutting mechanism may be arranged at any inclination to adapt the machine for trimming hedge fences.

What I claim is—

In a mower, the combination of an axle, carrying wheels, a main frame composed of independent sections 1 and 2, the section 1 being provided with a vertical flange arranged adjacent to the other section and extending forward from the axle to the front of the frame and having a vertical series of perforations, a draft pole connected with the section 2 and arranged adjacent to the vertical flange, and bearing against the same, the keeper plate secured to the pole and receiving the front of the vertical flange, a bell-crank lever fulcrumed on the pole and provided with a tooth arranged to engage any one of the said perforations and an operating lever connected with the bell crank lever, substantially as described.

In testimony that I claim the foregoing as my own I have hereto affixed my signature in the presence of two witnesses.

JOHN BEERMAKER.

Witnesses:
G. I. MOYER,
N. ROSENGREN.